US012670678B2

(12) United States Patent
    Song

(10) Patent No.: US 12,670,678 B2
(45) Date of Patent: Jun. 30, 2026

(54) OCCLUSAL VERTICAL DIMENSION REPRODUCTION METHOD FOR MANUFACTURING ARTIFICIAL TEETH

(71) Applicant: MEDIT CORP., Seoul (KR)

(72) Inventor: Myoung Woo Song, Seoul (KR)

(73) Assignee: MEDIT CORP., Seoul (KR)

( * ) Notice: Subject to any disclaimer, the term of this patent is extended or adjusted under 35 U.S.C. 154(b) by 251 days.

(21) Appl. No.: 18/027,253

(22) PCT Filed: Aug. 17, 2021

(86) PCT No.: PCT/KR2021/010855
    § 371 (c)(1),
    (2) Date: Mar. 20, 2023

(87) PCT Pub. No.: WO2022/059929
    PCT Pub. Date: Mar. 24, 2022

(65) Prior Publication Data
    US 2023/0360347 A1      Nov. 9, 2023

(30) Foreign Application Priority Data

Sep. 21, 2020    (KR) ........................ 10-2020-0121777
Nov. 16, 2020    (KR) ........................ 10-2020-0152563

(51) Int. Cl.
    *G06T 19/20*        (2011.01)
    *A61C 9/00*         (2006.01)
    *A61C 13/34*        (2006.01)
(52) U.S. Cl.
    CPC ............ *G06T 19/20* (2013.01); *A61C 9/0053* (2013.01); *A61C 13/34* (2013.01); *G06T 2210/41* (2013.01); *G06T 2219/2004* (2013.01)
(58) Field of Classification Search
    None
    See application file for complete search history.

(56) References Cited

U.S. PATENT DOCUMENTS

2013/0316302 A1    11/2013 Fisker
2014/0051037 A1*   2/2014 Fisker ................. A61C 8/0048
                                                        433/213
                        (Continued)

FOREIGN PATENT DOCUMENTS

CN        106061433 A     10/2016
JP       2016-107059 A     6/2016
                  (Continued)

OTHER PUBLICATIONS

Extended European Search Report dated Sep. 23, 2024 in Application No. 21869552.6.

(Continued)

*Primary Examiner* — Kee M Tung
*Assistant Examiner* — Biao Chen
(74) *Attorney, Agent, or Firm* — Sughrue Mion, PLLC

(57)            ABSTRACT

The present invention relates to an occlusal vertical dimension reproduction method for denture fabrication and, more specifically, to an occlusal vertical dimension reproduction method for denture fabrication, wherein three-dimensional scan data is used to calculate the occlusal vertical dimension required to denture fabrication. The occlusal vertical dimension reproduction method for denture fabrication according to the present invention has an advantage that the occlusal vertical dimension for effectively denture fabrication can be easily determined while minimizing the number of direct scans of the upper jaw and the lower jaw of a patient in an edentulous state or occlusal state to reproduce, in a virtual space, the occlusal state of the oral cavity of the patient wearing denture or denture structure.

16 Claims, 7 Drawing Sheets

(56)                References Cited

U.S. PATENT DOCUMENTS

| 2014/0255873 | A1* | 9/2014 | Bullis | A61C 8/0048 |
| | | | | 433/199.1 |
| 2015/0025855 | A1 | 1/2015 | Fisker et al. | |
| 2016/0106525 | A1* | 4/2016 | Kim | A61C 13/081 |
| | | | | 433/42 |
| 2016/0135931 | A1* | 5/2016 | Morales | A61C 8/0048 |
| | | | | 433/213 |
| 2016/0157967 | A1 | 6/2016 | Kim et al. | |
| 2016/0317263 | A9 | 11/2016 | Morales et al. | |
| 2016/0317264 | A1 | 11/2016 | Derraugh et al. | |
| 2017/0265977 | A1* | 9/2017 | Fisker | A61C 11/006 |
| 2018/0243057 | A1* | 8/2018 | Fisker | A61C 9/004 |

FOREIGN PATENT DOCUMENTS

| KR | 10-1799873 | B1 | 11/2017 |
| KR | 10-2018-0060502 | A | 6/2018 |
| KR | 10-2019-0013216 | A | 2/2019 |
| KR | 10-2114015 | B1 | 5/2020 |
| KR | 10-2020-0100448 | A | 8/2020 |

OTHER PUBLICATIONS

Se-Ha Kang et al., "Full mouth rehabilitation with dental implant utilizing 3D digital image and caD/caM system: case report", Journal of Dental Rehabilitation and Applied Science, Jun. 30, 2015, 12 pgs., vol. 31, No. 2.
International Search Report for PCT/KR2021/010855 dated, Nov. 25, 2021 (PCT/ISA/210).
Office Action issued May 17, 2022 in Korean Application No. 10-2020-0152563.
Chinese Office Action dated Jan. 31, 2026, issued in Chinese application No. 202180064588.5.

* cited by examiner

OCCLUSAL VERTICAL DIMENSION REPRODUCTION METHOD FOR MANUFACTURING ARTIFICIAL TEETH

CROSS REFERENCE TO RELATED APPLICATIONS

This application is a National Stage of International Application No. PCT/KR2021/010855 filed Aug. 17, 2021, claiming priority based on Korean Patent Application No. 10-2020-0121777 filed Sep. 21, 2020, and Korean Patent Application No. 10-2020-0152563 filed Nov. 16, 2020, the entire disclosures of which are incorporated herein by reference.

TECHNICAL FIELD

The present disclosure relates to an occlusal vertical dimension reproduction method for denture fabrication and, more specifically, to an occlusal vertical dimension reproduction method for denture fabrication, wherein three-dimensional data is used to reproduce an occlusal vertical dimension necessary for fabricating a denture.

BACKGROUND

A state in which there are no teeth in the upper or lower jaw of the oral cavity of the human body is referred to as "edentulous." When at least one of the upper and lower jaws is edentulous, a denture is fabricated and worn in many cases. When both the upper and lower jaws are edentulous, dentures are fabricated and worn on both jaws, and when only one jaw is edentulous, a denture is worn on the only one jaw.

As such, in order to fabricate a denture, it is important to determine an occlusal vertical dimension, which is the height of the denture or other teeth, at which the upper and lower jaws properly engage and occlude with each other, and to fabricate the denture according to the occlusal vertical dimension. When the denture is fabricated to fit the occlusal vertical dimension, there is no inconvenience in a user's mastication, and the user's facial impression is in a natural state.

In addition, when only one of the upper and lower jaws is edentulous, a denture having an appropriate size and shape considering an occlusal vertical dimension should be fabricated so that it becomes easy to establish a plan for implanting an artificial tooth in the upper or lower jaw on the opposite side of the edentulous jaw, or a plan for orthodontic treatment.

The conventional denture fabrication process is mostly performed manually, and it is necessary to go through a procedure for making a mold of a patient's edentulous jaw or adjusting an occlusal vertical dimension several times, so there has been substantial inconvenience not only for the patient but also for an operator.

The conventional denture fabrication process is described approximately as follows.

A mold of a patient's edentulous jaw is made using a resin material to obtain a preliminary impression. A plaster model is made using the preliminary impression to make a master cast for the edentulous jaw.

A recording base (a denture base) is made on the master cast by using resin or wax, and a wax rim (occlusion rim) is placed on the recording base. Artificial teeth are arranged in an appropriate position, direction, and height on such a wax rim. At this time, the position and direction of the artificial teeth, which are to be installed on a denture, are adjusted by using a device such as an articulator in consideration of the occlusion relationship.

In this process, a wax rim-type denture is actually fitted onto the edentulous jaw of the patient several times to check and adjust the occlusion state. As such, the process of arranging artificial teeth on a wax rim is performed mostly by hand, so the degree of completion is greatly influenced by the experience and skill of an operator. In addition, in the process of fabricating a wax rim denture, the patient has to visit the dentist several times, and the operator also has to adjust the occlusal vertical dimension and the arrangement of the artificial teeth on the wax-rim several times, which is quite cumbersome.

When the wax rim denture fabrication is completed, the wax rim denture is placed in a mold, the wax rim is melted and removed with hot water, and then a resin replacing the wax rim is filled and cured, thereby completing the denture fabrication.

When the occlusal vertical dimension of a patient can be effectively reproduced in a virtual three-dimensional space by scanning the patient's oral structure and denture structure, the process of fabricating dentures may be improved to quickly and easily fabricate a denture, and the inconvenience of the patient and the operator in the process of fabricating the denture may also be reduced.

SUMMARY

The present disclosure has been made to solve the problems described above, and an aspect of the present disclosure is to provide an occlusal vertical dimension reproduction method for denture fabrication, wherein plans for denture fabrication, implant placement, or teeth straightening for an edentulous patient may be easily made by accurately calculating an occlusal vertical dimension by using three-dimensional information of the patient's oral cavity.

In order to achieve the above aspect, an occlusal vertical dimension reproduction method for denture fabrication, according to the present disclosure, includes: operation (a) of obtaining edentulous jaw shape information, which is shape information of an edentulous state of at least one of upper or lower jaws of a patient; operation (b) of obtaining denture shape information, which is shape information of a denture structure having a corresponding shape so as to engage with one of the patient's upper and lower jaws in an edentulous state; operation (c) of obtaining occlusion shape information, which is shape information of the denture structure when the upper and lower jaws are in occlusion while the patient is wearing the denture structure on an edentulous jaw; operation (d) of aligning and arranging corresponding surfaces of the edentulous jaw shape information and the denture shape information with the occlusion shape information in a state in which the corresponding surfaces are aligned with each other; and operation (e) of calculating a positional relationship between the upper and lower jaws in a state in which the edentulous jaw shape information, the denture shape information, and the occlusion shape information are aligned by operation (d).

The occlusal vertical dimension reproduction method for denture fabrication of the present disclosure is advantageous in that it is possible to easily identify an occlusal vertical dimension for effective fabrication of a new denture while minimizing the number of times of directly scanning upper and lower jaws of a patient in an edentulous state or an occlusal state and reproduce the occlusal state of an oral cavity of the patient wearing a denture or a denture structure.

The occlusal vertical dimension reproduction method for denture fabrication of the present disclosure has an effect of reducing inconvenience of a patient and an operator in the process of fabricating dentures compared with the prior art.

DETAILED DESCRIPTION

Hereinafter, an occlusal vertical dimension reproduction method for denture fabrication according to the present disclosure will be described with reference to the accompanying drawings.

Figure 1:
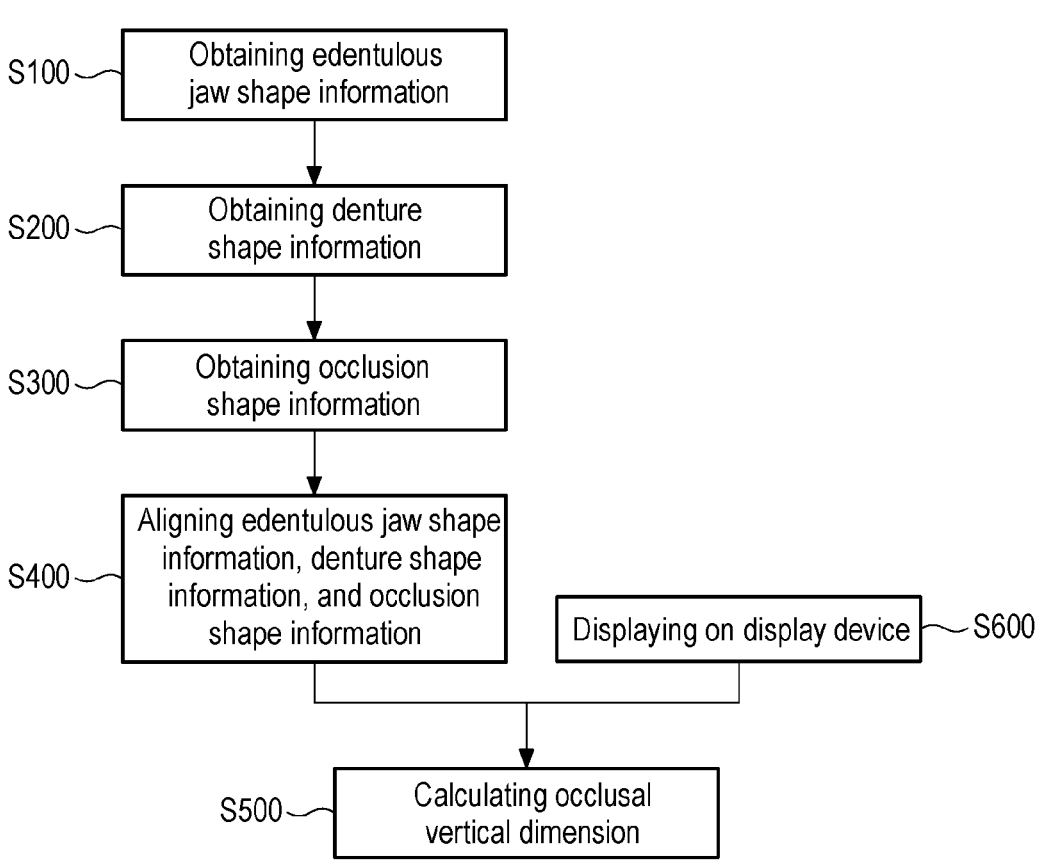
FIG. 1 is a flowchart illustrating an embodiment of implementing an occlusal vertical dimension reproduction method for denture fabrication according to the present disclosure.

FIG. 1 is a flowchart illustrating an embodiment of implementing an occlusal vertical dimension reproduction method for denture fabrication according to the present disclosure.

Figure 2:
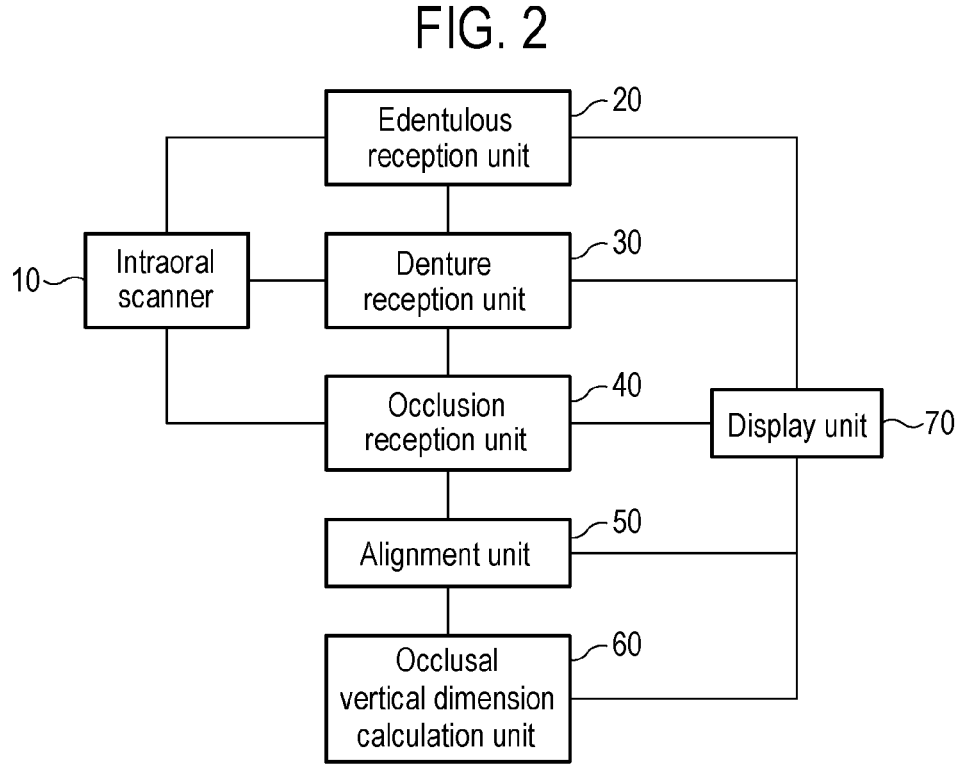
FIG. 2 is a block diagram showing an embodiment of the configuration of a device for implementing an occlusal vertical dimension reproduction method for denture fabrication according to the present disclosure.

FIG. 2 is a block diagram illustrating an embodiment of the configuration of a device for implementing an occlusal vertical dimension reproduction method for denture fabrication according to the present disclosure.

FIGS. 3 to 7 illustrate a process of implementing an occlusal vertical dimension reproduction method for denture fabrication according to the present disclosure.

An aspect of the present disclosure is to acquire a patient's occlusal vertical dimension by a relatively easy method in the process of fabricating a denture suitable for the patient's occlusion to improve the quality of denture fabricated.

An example of a device used to perform the occlusal vertical dimension reproduction method for denture fabrication according to the present disclosure is as illustrated in FIG. 2. A device for performing the occlusal vertical dimension reproduction method for denture fabrication according to the present disclosure includes an intraoral scanner 10 configured to scanning a tooth, an edentulous jaw, a denture, a denture structure, etc. of a patient and obtain shape information thereof, and a display device for displaying the shape information obtained through the intraoral scanner 10. In addition, the device for performing the occlusal vertical dimension reproduction method for denture fabrication according to the present disclosure includes an edentulous reception unit 20 configured to receive edentulous jaw shape information, a denture reception unit 30 configured to receive shape information of a denture structure, an occlusion reception unit 40 configured to receive occlusion shape information, an alignment unit 50 configured to align the edentulous jaw shape information and the denture shape information with the occlusion shape information, and an occlusal vertical dimension calculation unit 60 configured to calculate an occlusal vertical dimension between upper and lower jaws based on the edentulous jaw shape information and denture shape information aligned by the alignment unit 50.

Hereinafter, specific operations of the device for implementing an occlusal vertical dimension reproduction method for denture fabrication, as described above, and the occlusal vertical dimension reproduction method for denture fabrication according to the present disclosure will be described in detail.

First, the edentulous reception unit 20 receives edentulous jaw shape information, which is shape information of the edentulous state of at least one of the upper or lower jaws of a patient, by using the intraoral scanner 10 (operation (a), S100). The edentulous jaw shape information is obtained by scanning an edentulous part of the patient's upper and lower jaws with the scanner depending on the structure and state of the patient's teeth. When only one of the upper and lower jaws is edentulous, the edentulous reception unit 20 receives edentulous jaw shape information of the edentulous part. When both the upper and lower jaws of the patient are edentulous, the edentulous reception unit 20 receives edentulous jaw shape information obtained by scanning each of the upper and lower jaws. Hereinafter, the occlusal vertical dimension reproduction method for denture fabrication according to the present embodiment will be described using an example in which both the upper and lower jaws of the patient are edentulous.

Figure 3:
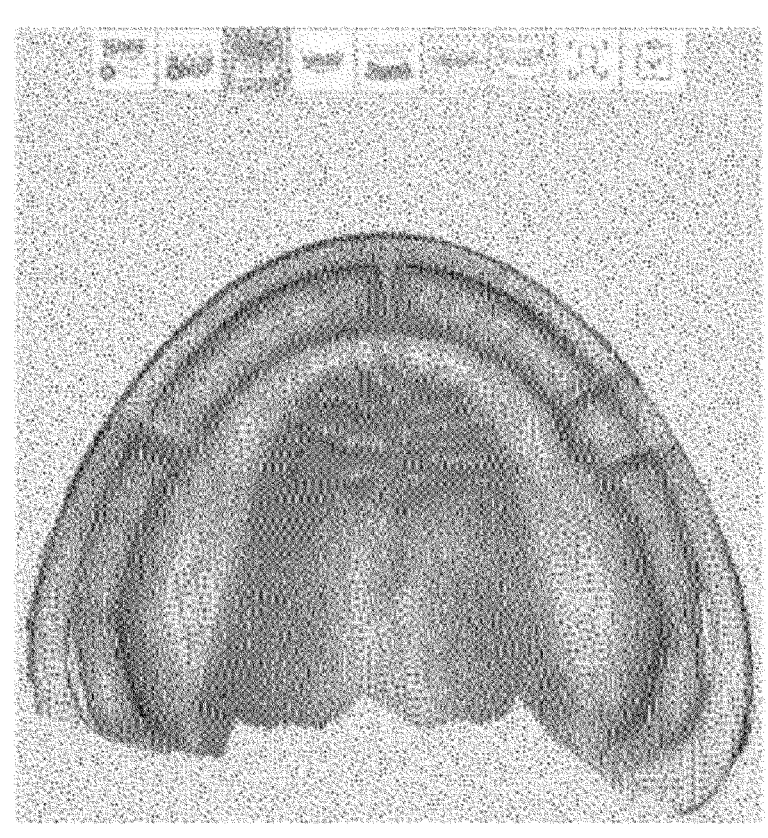
FIGS. 3 to 7 illustrate a process of implementing an occlusal vertical dimension reproduction method for denture fabrication according to the present disclosure.

The edentulous jaw shape information received by the edentulous reception unit 20 is displayed on the display device as illustrated in FIG. 3 by a display unit 70 (operation (f), S600). FIG. 3 illustrates the edentulous jaw shape information of the patient's edentulous upper jaw, received by the edentulous reception unit 20 in operation (a) and displayed by the display unit 70.

Next, the denture reception unit 30 receives denture shape information, which has been obtained by the intraoral scanner 10 and is shape information of a denture structure formed in a corresponding shape so as to engage with the edentulous upper and/or lower jaw of the patient (operation (b), S200). The denture structure is a denture, which is to be worn on an edentulous part of a patient, or a structure equivalent thereto. An existing denture used by the patient may become the denture structure, or a wax rim as a structure in the intermediate process for fabricating a denture by making a mold of the patient's edentulous part may become the denture structure. The aspect of using an existing denture as a denture structure is to fabricate a new denture by identifying an occlusal vertical dimension of the patient based on the existing denture or to fabricate a denture that better matches the patient's edentulous jaw than the existing denture.

Operation (b) is performed in such a manner that the denture reception unit 30 receives, as denture shape information, a result of scanning the denture structure by the intraoral scanner 10.

At this time, the denture reception unit 30 may acquire denture shape information by accumulating only scan shots resulting from scanning the denture structure by using the intraoral scanner 10, and may complete the denture shape information by referencing the edentulous jaw shape information received by the edentulous reception unit 20.

That is, the denture reception unit 30 may complete denture shape information by merging scan shots of the inner surface (the surface corresponding to the edentulous jaw shape information) of a denture structure scanned by the intraoral scanner 10 and aligning the merged scan shots on a corresponding surface in the edentulous jaw shape information. In addition, this process may be performed in a manner in which denture shape information is acquired by accumulating scan shots from the intraoral scanner 10 and aligning the scan shots with edentulous jaw shape information in real time. In this way, when denture shape information is obtained by merging scan shots of a denture structure for a part corresponding to edentulous jaw shape information in real time and aligning the scan shots with the edentulous jaw shape, there is an advantage of obtaining the denture shape information which is more accurate and at the same time more accurately aligned with the edentulous jaw shape information. This is because it is possible to complete the denture shape information while optimizing the scan shots, based on the already acquired edentulous jaw shape information.

Also, in some cases, denture shape information may be completed by acquiring, by the denture reception unit 30, only a part of a surface corresponding to the edentulous jaw shape information by using a scan shot captured by the intraoral scanner 10, aligning the acquired part with the edentulous jaw shape information, and then scanning the outer surface of the denture structure.

In some cases, an assembly of a denture and an impression for making a mold of the patient's edentulous jaw may become a denture structure. When re-lining or re-basing is performed to fill the space between the patient's edentulous jaw and a denture, an impression is obtained by pressing curable resin on the edentulous jaw while the curable resin is applied to the inner surface of the denture. In such cases, an assembly of the impression and the denture may be a denture structure. In this case, the denture structure in which the impression and denture may be assembled together is scanned by the intraoral scanner 10 so that the denture reception unit 30 receives denture shape information.

In some cases, it is also possible for the denture reception unit 30 to acquire denture shape information by scanning and integrating the denture and the impression. In addition, it is possible for the reception unit to acquire shape information of the denture structure as denture shape information by scanning the inner surface (a surface in contact with the edentulous jaw) of the impression and then scanning the outer surface (a part where artificial teeth are exposed) of the denture, and combining the scanned surfaces with each other by using a method such as iterative closest points (ICP), etc.

When the impression is used in this way, the space between the dentures and the edentulous jaw may be filled with the impression, so that the inner shape of the impression becomes extremely similar to the shape of the patient's edentulous jaw. Therefore, in this case, it is also possible to indirectly obtain edentulous jaw shape information by scanning the inner surface of the impression without directly scanning the patient's edentulous jaw. That is, it is also possible to perform operation (a) such that denture shape information is obtained by scanning the shape of the inner surface of the impression brought into contact with the edentulous jaw and then inverting the scanned shape. In some cases, even when a denture structure is a wax rim or denture which has no impression, it is also possible to obtain edentulous jaw shape information by reversing scan information of the inner surface of the denture structure and inverting the inner and outer sides of the denture structure. That is, after scanning the inner surface of the denture structure, when the inside and outside of the part are reversed (inverted), the edentulous jaw shape information may be obtained.

Figure 4:
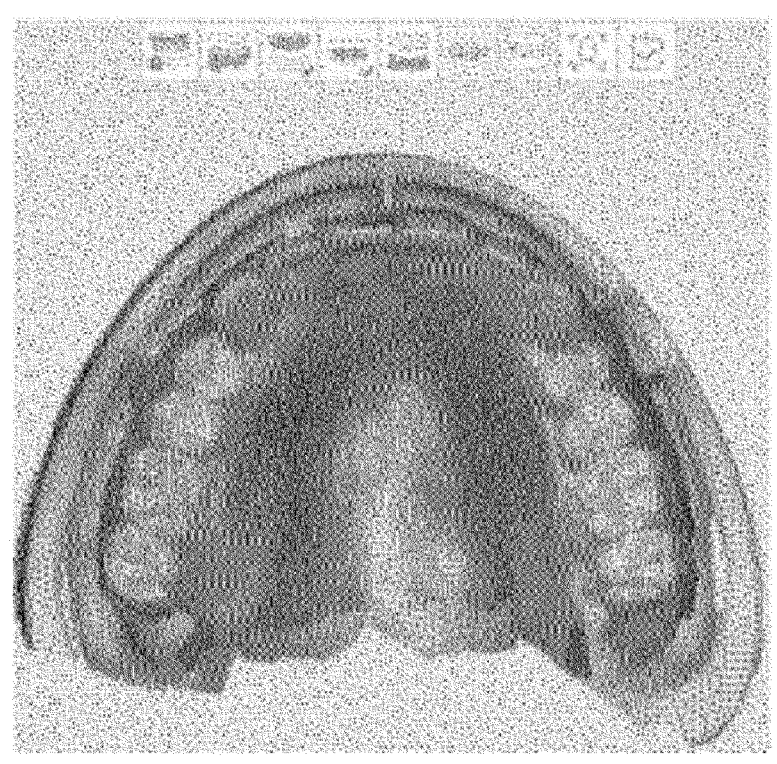

The denture shape information received by the denture reception unit 30 in this way is displayed on the display device by the display unit 70 (operation (f), S600). FIG. 4 illustrates the denture shape information of a denture, which has been received by the denture reception unit 30 in operation (b), aligned with the edentulous jaw shape information, and then displayed by the display unit 70. Here, as described above, the denture shape information is aligned with the edentulous jaw shape information in real time, and thus, when the denture structure is scanned while the edentulous jaw shape information is displayed on the display unit 70, denture shape information having a three-dimensional shape realized by a scan shot is displayed on the display unit 70 in a state of being aligned with the edentulous jaw shape information.

Next, the occlusion reception unit 40 receives occlusion shape information, which is shape information of the oral cavity and the denture structure when the upper and lower jaws are in occlusion while the patient is wearing the denture structure on the edentulous jaw (operation (c), S300). When only one of the upper and lower jaws of the patient is edentulous, the intraoral scanner 10 scans shape information of a state in which the upper and lower jaws are in occlusion while the denture structure is worn on the edentulous part, and the occlusion shape information obtained accordingly is received by the occlusion reception unit 40. In this case, the occlusion shape information is obtained in a state where the denture structure is worn on one side and the patient's actual teeth are on the other side.

Operation (c) is performed to determine the position of the upper and lower jaws in a state in which the upper and lower jaws are in occlusion while the patient is wearing the denture structure. At this time, the patient may be wearing an existing denture in use as the denture structure, or may be wearing, as the denture structure, an intermediate structure which corresponds to a denture and has been created in the process of fabricating the denture. In any structure, operation (c) is performed in a state in which the shape of the oral cavity, in which the upper and lower jaws are in occlusion while the denture structure is worn regardless of the structure, can be determined.

In the case of a patient whose upper and lower jaws are both edentulous, the occlusion reception unit 40 receives occlusion shape information obtained by performing scanning in a state in which the upper and lower jaws are in occlusion while denture structures are worn on both the upper and lower jaws.

Figure 5:
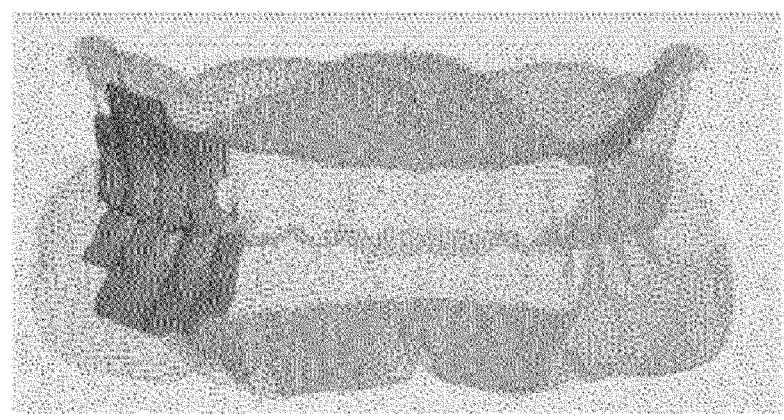

The occlusion shape information received by the occlusion reception unit 40 in this way is displayed on the display device by the display unit 70 (operation (f), S600). FIG. 5 illustrates a state in which the display unit 70 displays the occlusion shape information on the display device.

Next, the alignment unit 50 aligns corresponding surfaces of the edentulous jaw shape information and the denture shape information, and then aligns and arranges the corresponding surfaces so as to overlap the occlusion shape information (operation (d), S400).

The alignment unit 50 aligns the corresponding surfaces of the edentulous jaw shape information and the denture shape information with each other by an iterative closest points (ICP) technique, and aligns the corresponding surfaces again so as to overlap the occlusion shape information. The edentulous jaw shape information is a shape corresponding to the inner surface (rear surface) of the denture shape information. Thus, the edentulous jaw shape information and the denture shape information may be accurately and precisely matched by the ICP technique of repeatedly finding and matching closest points, and may be arranged in a three-dimensional space. In addition, the "edentulous jaw shape information and denture shape information" aligned with each other in this way have a relatively high proportion of parts in which the edentulous jaw shape information and denture shape information substantially match the occlusion shape information acquired in operation (c) in terms of an outer surface shape, and may thus be aligned and arranged to accurately overlap each other by using the ICP technique as described above. The process of finally arranging the edentulous jaw shape information at an occlusion position in the three-dimensional space by this technique is completed. That is, the edentulous jaw shape information and the denture shape information may be aligned at an occlusion position, based on the occlusion shape information obtained in operation (c).

Figure 6:
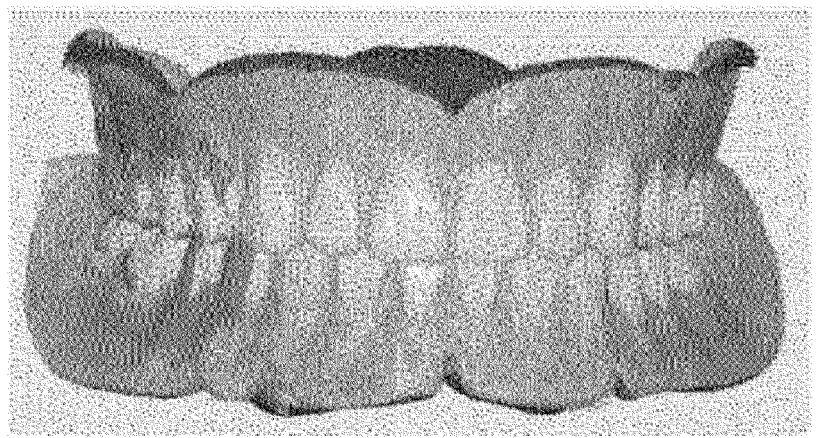
Figure 7:
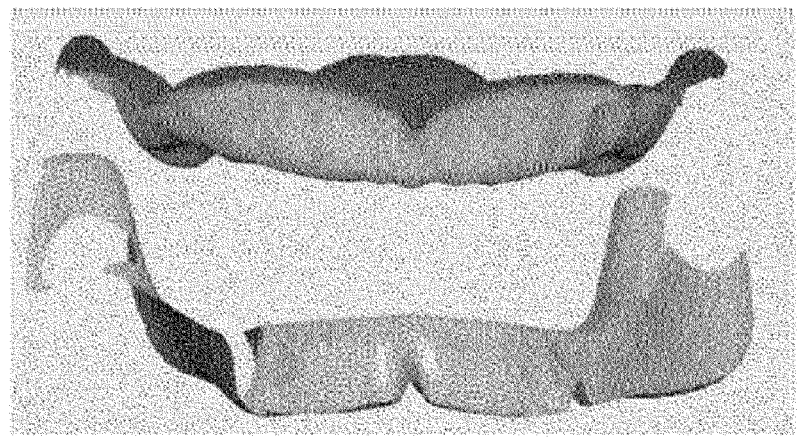

The edentulous jaw shape information, the denture shape information, and the occlusion shape information, aligned by the alignment unit 50 in this way, are displayed on the display device by the display unit 70 (operation (f), S600). FIG. 6 illustrates a state in which the display unit 70 displays the edentulous jaw shape information, the denture shape information, and the occlusion shape information in an overlapping manner on the display device. Depending on a user's selection, the display unit 70 may selectively display only at least one of the edentulous jaw shape information, the denture shape information, or the occlusion shape information. FIG. 7 illustrates a state in which the display unit 70 displays only edentulous jaw shape information of upper and lower jaws in occlusion on the display device.

In this state, the occlusal vertical dimension calculation unit 60 calculates occlusal vertical dimensions corresponding to dimensions of a relative position and a direction between the upper and lower jaws in a state in which the edentulous jaw shape information, the denture shape information, and the occlusion shape information are aligned by operation (d) (operation (e), S500).

Referring to FIG. 7, the occlusal vertical dimension calculation unit 60 may calculate only the closest distance and the farthest distance between the upper and lower jaws, and may provide information obtained by calculating a relative position as a concept that includes both the direction and distance between the upper and lower jaws. In some cases, the relative distance and direction between the upper and lower jaws may be calculated for each position along extension paths of the upper and lower jaws, and may be provided as a result. Also, in some cases, the display unit 70 may provide a tool for calculating and providing, for each position, differences in distance and direction between the upper and lower jaws. In addition, in some cases, the display unit 70 may provide a tool for calculating and providing differences in distance and direction between the upper and lower jaws at a point designated by the user through an input device such as a mouse.

The method as described above may have the advantage of reproducing an occlusal vertical dimension for effectively fabricating a new denture while minimizing the number of directly scanning a patient's edentulous jaw or upper and lower jaws in occlusion. That is, it is possible to effectively reproduce an occlusal vertical dimension by using an existing denture in use as a denture structure and then use the occlusal vertical dimension as basic information for adjusting the shape of the existing denture or fabricating a new denture that the patient can wear more comfortably. In addition, with respect to a denture structure as an intermediate process of denture fabrication, such as wax rim, when an occlusal vertical dimension in the state of wearing the denture structure is calculated using the present disclosure, information necessary for wax rim correction (i.e., fabricating an artificial tooth by removing a part of the wax rim) may be obtained. That is, it is possible to fabricate an optimal wax rim while easily checking whether the occlusal vertical dimension by the wax rim matches the occlusal vertical dimension of the existing denture in use.

As described above, the number of times of scanning the patient's oral structure directly may be minimized, and thus the number of times the patient visits a dentist in a denture fabrication process may be reduced, and the number of times the dentist directly checks, in the denture fabrication process, whether a denture fits the patient's edentulous jaw and whether occlusion is appropriate may also be reduced.

In addition, the occlusal vertical dimension reproduction method for denture fabrication, according to the present disclosure, may also be used to quickly and accurately fabricate a denture while reducing the number of trials and errors in adjusting an occlusal vertical dimension of the denture and determining the degree of matching with an edentulous jaw compared with the conventional denture fabrication process.

In the above, the present disclosure has been described with the exemplary examples, but the scope of the present disclosure is not limited to the forms described and illustrated above.

For example, it has been described that in operations (a) to (c), shape information acquired using the intraoral scanner 10 is received, but it is also possible to use shape information acquired using a typical scanner or measurement device other than the intraoral scanner 10.

In addition, it has been described above that operation (f) of displaying the edentulous jaw shape information and the denture shape information on the display device is performed, but in some cases, it is possible to omit operation (f) in the process of implementing the occlusal vertical dimension method for denture fabrication. In addition, even when operation (f) is performed, all of the edentulous jaw shape information, the denture shape information, and the occlusion shape information may be displayed. Also, operation (f) may be performed to display the shape of a patient's oral cavity and denture in various ways not described above, such as a way to display only some of these types of information or to display these types of information so as to overlap each other.

In addition, it has been described above that the occlusal shape information received by the occlusion reception unit 40 through operation (c) is shape information of a denture structure and an oral cavity in a state in which the upper and lower jaws are in occlusion while the patient is wearing the denture structure on the edentulous jaw. However, when the patient wears denture structures on both the upper and lower jaws, the occlusion reception unit may receive only shape information of the denture structures in occlusion as occlusion shape information in operation (c).

What is claimed is:

1. An occlusal vertical dimension reproduction method for denture fabrication, the method comprising:

operation (a) of obtaining edentulous jaw shape information, which is shape information of an edentulous state of at least one of upper or lower jaws of a patient;

operation (b) of obtaining denture shape information, which is shape information of a denture structure having a corresponding shape so as to engage with one of the patient's upper and lower jaws in an edentulous state wherein the denture shape information includes shape information of an inner surface of the denture structure without an impression layer that corresponds to the edentulous jaw shape information;

operation (c) of obtaining occlusion shape information, which is shape information of the denture structure when the upper and lower jaws are in occlusion while the patient is wearing the denture structure on an edentulous jaw;

operation (d) of aligning and arranging corresponding surfaces of the edentulous jaw shape information and the denture shape information with the occlusion shape information in a state in which the corresponding surfaces are aligned with each other; and operation (e) of calculating a positional relationship between the upper and lower jaws in a state in which the edentulous jaw shape information, the denture shape information, and the occlusion shape information are aligned by the operation (d), wherein in operation (b), the denture shape information is obtained by merging multiple scan shots obtained using a scanner, and at least one scan shot constituting a surface corresponding to the edentulous jaw shape information in the denture shape information is aligned with the edentulous jaw shape information simultaneously upon being obtained.

2. The occlusal vertical dimension reproduction method for denture fabrication of claim 1, wherein after operation (a) is performed, in operation (b), the denture shape information is obtained by aligning a scan shot obtained using a scanner with the edentulous jaw shape information.

3. The occlusal vertical dimension reproduction method for denture fabrication of claim 1, wherein in operation (b), only a part of a surface of the denture shape information corresponding to the edentulous jaw shape information is obtained.

4. The occlusal vertical dimension reproduction method for denture fabrication of claim 1, wherein in operation (e), differences in relative position and direction between the upper and lower jaws are further calculated.

5. The occlusal vertical dimension reproduction method for denture fabrication of claim 1, wherein in operation (a), the edentulous jaw shape information is obtained by scanning an edentulous part of the upper and lower jaws of the patient by using a scanner, and in operation (b), the denture shape information is obtained by scanning the denture structure by using the scanner.

6. The occlusal vertical dimension reproduction method for denture fabrication of claim 1, wherein in operation (b), the denture shape information is obtained by scanning the denture structure by using a scanner, and in operation (a), the edentulous jaw shape information is obtained by inverting a shape of an inner surface which is in contact with the edentulous jaw of the denture structure of the denture shape information obtained in operation (b).

7. The occlusal vertical dimension reproduction method for denture fabrication of claim 1, wherein in operation (a), the edentulous jaw shape information is obtained by scanning an inner surface of the denture structure in contact with the edentulous jaw by using a scanner.

8. The occlusal vertical dimension reproduction method for denture fabrication of claim 7, wherein in operation (a), the edentulous jaw shape information obtained by scanning the inner surface of the denture structure in contact with the edentulous jaw by using the scanner is inverted.

9. The occlusal vertical dimension reproduction method for denture fabrication of claim 1, wherein the denture structure in operation (b) is one of a denture and a wax rim.

10. The occlusal vertical dimension reproduction method for denture fabrication of claim 1, wherein in operation (a), when both the upper and lower jaws of the patient are edentulous, the edentulous jaw shape information of each of the upper and lower jaws is obtained, and when only one of the upper and lower jaws of the patient is edentulous, the edentulous jaw shape information of the edentulous jaw is obtained, and in operation (b), when both the upper and lower jaws of the patient are edentulous, the denture shape information of the denture structure of each of the upper and lower jaws is obtained, and when only one of the upper and lower jaws of the patient is edentulous, the denture shape information of the denture structure on the edentulous jaw is obtained.

11. The occlusal vertical dimension reproduction method for denture fabrication of claim 1, further comprising operation (f) of displaying the edentulous jaw shape information and the denture shape information on a display device.

12. The occlusal vertical dimension reproduction method for denture fabrication of claim 11, wherein in operation (f), a state in which the edentulous jaw shape information and the denture shape information have been aligned with the occlusion shape information in operation (d) is displayed on the display device.

13. The occlusal vertical dimension reproduction method for denture fabrication of claim 12, wherein in operation (f), at least one of the edentulous jaw shape information, the denture shape information, or the occlusion shape information is selectively displayed on a screen.

14. An occlusal vertical dimension reproduction method for denture fabrication, the method comprising:

operation (a) of obtaining edentulous jaw shape information, which is shape information of an edentulous state of at least one of upper or lower jaws of a patient;

operation (b) of obtaining denture shape information, which is shape information of a denture structure having a corresponding shape so as to engage with one of the patient's upper and lower jaws in an edentulous state wherein the denture shape information includes shape information of an inner surface of the denture structure that corresponds to the edentulous jaw shape information;

operation (c) of obtaining occlusion shape information, which is shape information of the denture structure when the upper and lower jaws are in occlusion while the patient is wearing the denture structure on an edentulous jaw;

operation (d) of aligning and arranging corresponding surfaces of the edentulous jaw shape information and the denture shape information with the occlusion shape information in a state in which the corresponding surfaces are aligned with each other; and operation (e) of calculating a positional relationship between the upper and lower jaws in a state in which the edentulous jaw shape information, the denture shape information, and the occlusion shape information are aligned by the operation (d), wherein the denture structure is an assembly of a denture and an impression for making a mold of the patient's edentulous jaw, wherein in operation (b), the denture shape information is obtained by scanning the denture structure by using a scanner, and the denture shape information is obtained by combining information resulting from scanning an inner surface of the impression of the denture structure and an outer surface of the denture of the denture structure.

15. The occlusal vertical dimension reproduction method for denture fabrication of claim 14, wherein in operation (a), the edentulous jaw shape information is obtained by scanning an inner surface of the denture structure in contact with the edentulous jaw by using the scanner.

16. The occlusal vertical dimension reproduction method for denture fabrication of claim 14, wherein in operation (a), when both the upper and lower jaws of the patient are edentulous, the edentulous jaw shape information of each of the upper and lower jaws is obtained, and when only one of the upper and lower jaws of the patient is edentulous, the edentulous jaw shape information of the edentulous jaw is obtained, and in operation (b), when both the upper and lower jaws of the patient are edentulous, the denture shape information of the denture structure of each of the upper and lower jaws is obtained, and when only one of the upper and lower jaws of the patient is edentulous, the denture shape information of the denture structure on the edentulous jaw is obtained.

* * * * *